US011187382B2

(12) United States Patent
Thieu et al.

(10) Patent No.: US 11,187,382 B2
(45) Date of Patent: Nov. 30, 2021

(54) DEVICE AND METHOD FOR FILLING TANKS

(71) Applicant: L'Air Liquide, Societe Anonyme pour l'Etude et l'Exploitation des Procedes Georges Claude, Paris (FR)

(72) Inventors: Anh Thao Thieu, Les Loges-en-Josas (FR); Louis Debesombes, Sugar Land, TX (US); Vincent Fairy, Houston, TX (US)

(73) Assignees: L'Air Liquide Societe Anonyme Pour L'Etude, Paris (FR); Et L'Exploitation Des Procedes Georges Claude, Paris (FR)

( * ) Notice: Subject to any disclaimer, the term of this patent is extended or adjusted under 35 U.S.C. 154(b) by 0 days.

(21) Appl. No.: 16/919,752

(22) Filed: Jul. 2, 2020

(65) Prior Publication Data

US 2021/0003253 A1 Jan. 7, 2021

(30) Foreign Application Priority Data

Jul. 3, 2019 (FR) ...................................... 1907365

(51) Int. Cl.
*F17C 5/00* (2006.01)
*F17C 5/06* (2006.01)
*F17C 13/02* (2006.01)

(52) U.S. Cl.
CPC ................ *F17C 5/007* (2013.01); *F17C 5/06* (2013.01); *F17C 13/025* (2013.01);
(Continued)

(58) Field of Classification Search
CPC ........ F17C 5/007; F17C 5/006; F17C 13/025; F17C 2205/0323; F17C 2205/0382;
(Continued)

(56) References Cited

U.S. PATENT DOCUMENTS 3,427,815 A * 2/1969 Pitlor .................... F17C 13/026
62/50.2
5,687,776 A * 11/1997 Forgash ................. F17C 5/007
141/11
(Continued)

FOREIGN PATENT DOCUMENTS

| EP | 0 933 583 | 8/1999 |
| FR | 2 928 716 | 9/2009 |
| WO | WO 2016/172637 | 10/2016 |

OTHER PUBLICATIONS

French Search Report and Written Opinion for FR 1907365, dated Feb. 25, 2020.
(Continued)

*Primary Examiner* — Timothy L Maust
*Assistant Examiner* — James R Hakomaki
(74) *Attorney, Agent, or Firm* — Christopher J. Cronin (57) ABSTRACT

Device and method for filling pressurized-gas tanks, comprising a fluid transfer circuit provided with an upstream end intended to be connected to a source of gas and at least two parallel downstream ends intended to be connected to distinct tanks that are to be filled, the transfer circuit comprising a temperature regulating member for regulating the temperature of the gas transferred from the source towards the downstream ends, the gas temperature regulating member being positioned in the transfer circuit upstream of the at least two downstream ends, which means to say that the gas temperature regulating member is common to the at least two downstream ends, characterized in that the at least two downstream ends of the circuit each comprise a respective control member for controlling the flow rate and/or the pressure of the transferred gas and configured to control the flow rate and/or the pressure in each of the downstream ends independently.

14 Claims, 3 Drawing Sheets

(52) U.S. Cl.
CPC ............... *F17C 2205/0323* (2013.01); *F17C 2205/0382* (2013.01); *F17C 2221/012* (2013.01); *F17C 2223/036* (2013.01)

(58) Field of Classification Search
CPC .......... F17C 2221/012; F17C 2223/026; F17C 5/06; F17C 2250/0439; Y02E 60/32
USPC ............................................................ 141/4
See application file for complete search history.

(56) References Cited

U.S. PATENT DOCUMENTS

| | | | | |
|---|---|---|---|---|
| 5,826,632 | A * | 10/1998 | Micke | F17C 5/06 141/9 |
| 8,671,997 | B2 | 3/2014 | Allidieres et al. | |
| 10,088,229 | B2 * | 10/2018 | Howard | F25J 1/0264 |
| 10,883,662 | B2 * | 1/2021 | Nagura | F17C 5/06 |
| 11,015,763 | B2 * | 5/2021 | Yoshida | F17C 5/007 |
| 2008/0185068 | A1 * | 8/2008 | Cohen | F17C 5/06 141/94 |
| 2009/0107577 | A1 * | 4/2009 | Allidieres | F17C 7/00 141/1 |
| 2009/0229701 | A1 * | 9/2009 | Allidieres | F17C 5/06 141/2 |
| 2011/0259469 | A1 | 10/2011 | Harty et al. | |
| 2014/0196814 | A1 * | 7/2014 | Nagura | F17C 13/026 141/82 |
| 2014/0290790 | A1 * | 10/2014 | Mathison | F17C 5/007 141/4 |
| 2014/0311622 | A1 * | 10/2014 | Cohen | F17C 13/025 141/4 |
| 2015/0153005 | A1 * | 6/2015 | Takano | F17C 5/007 141/4 |
| 2016/0146400 | A1 * | 5/2016 | Allidieres | F17C 5/06 141/4 |
| 2017/0059089 | A1 * | 3/2017 | Uchida | F17C 13/026 |
| 2017/0067600 | A1 * | 3/2017 | Poorman | F17C 5/06 |
| 2017/0146194 | A1 | 5/2017 | Youlio et al. | |
| 2018/0023764 | A1 * | 1/2018 | Okuno | F17C 5/06 141/197 |
| 2018/0045372 | A1 * | 2/2018 | Nicotra | F17C 13/025 |
| 2018/0066799 | A1 * | 3/2018 | Ravinel | F17C 5/007 |
| 2018/0320823 | A1 * | 11/2018 | Poorman | F17C 5/06 |
| 2019/0003648 | A1 * | 1/2019 | Kunberger | F17C 13/028 |
| 2019/0277448 | A1 * | 9/2019 | Krogsgaard | F17C 5/06 |
| 2020/0173607 | A1 * | 6/2020 | Mathison | F17C 13/026 |

OTHER PUBLICATIONS

European "HyTransfer" Project, "Pre-Normative Research for Thermodynamic Optimization of Fast Hydrogen Transfer," https://www.fch.europa.eu/project/pre-normative-research-themnodynamic-optimization-fast-hydrogen-transfer, printed from website Jun. 30, 2020, 2 pages.

* cited by examiner

DEVICE AND METHOD FOR FILLING TANKS

CROSS-REFERENCE TO RELATED APPLICATIONS

This application claims the benefit of priority under 35 U.S.C. § 119 (a) and (b) to French patent application No. FR 1 907 365, filed Jul. 3, 2019, the entire contents of which are incorporated herein by reference.

BACKGROUND

Field of the Invention

The invention relates to a device and a method for filling tanks.

The invention relates more particularly to a device for filling pressurized-gas tanks, particularly vehicle hydrogen tanks, comprising a fluid transfer circuit provided with an upstream end intended to be connected to a source of gas and at least two parallel downstream ends intended to be connected to distinct tanks that are to be filled, the transfer circuit comprising a temperature regulating member for regulating the temperature of the gas transferred from the source towards the downstream ends, the gas temperature regulating member being positioned in the transfer circuit upstream of the at least two downstream ends, which means to say that the gas temperature regulating member is common to the at least two downstream ends.

Related Art

In order to fill pressurized gaseous hydrogen tanks quickly, it is generally necessary to pre-cool the gas in order to avoid overheating of the filled tank.

Existing devices or service stations are generally small in size and have one or two filling points each equipped with its own cooling device.

The increase in the capacity of the stations and in the number of filling points therefore multiplies the number of cooling devices.

In addition, this pre-cooling of the hydrogen prior to filling is very demanding. The gas flow that is to be cooled may have a highly variable flow rate (0.5-1.8 kg/min for example) with highly variable inlet temperatures (ambient temperature, −20° C. to 40° C.). Furthermore, the greater the Joule-Thomson heating effect, the more this high-pressure gas supplied by the gas source expands.

In known installations, the hydrogen is conveyed first of all towards the distributors. It is then expanded to the required pressure at the distributor. Cooling is then performed via an exchanger inside the distributor in order to be able to neutralize the Joule-Thomson heating effect. Each distributor must therefore be fitted with an exchanger and with a connection to the cooling system. For high-capacity service stations, this cooling system increases the cost and the complexity of the installation.

Document EP0933583A2 describes a tank filling installation comprising a communal upstream cooling system for the simultaneous filling of several cylinders. This design does not allow the filling to be adapted to suit different tanks which may for example have different structural characteristics and/or different starting pressures.

SUMMARY OF THE INVENTION

One aim of the present invention is to alleviate all or some of the above-mentioned disadvantages of the prior art.

To this end, the device according to the invention, in other respects in accordance with the generic definition thereof given by the above preamble, is essentially characterized in that the at least two downstream ends of the circuit each comprise a respective member for controlling the flow rate and/or the pressure of the transferred gas and configured to control the flow rate and/or the pressure in each of the downstream ends independently.

Moreover, embodiments of the invention may comprise one or more of the following features:

- the member for controlling the flow rate and/or the pressure for each downstream end comprises a controlled pressure-control and/or flow rate-control valve, the filling device comprising an electronic controller configured to control the said valves,
- the controller is configured to control the said valves according to one or more quick-fill algorithms establishing identical or distinct respective rates of pressure increase in the said tanks,
- the device comprises, in each downstream end, a temperature sensor that measures the temperature of the gas, the said sensors being connected to the controller,
- the temperature sensors are positioned downstream of the respective flow rate-control and/or pressure-control members,
- the controller is configured to control the flow rate-control and/or pressure-control member for each downstream end as a function of the temperature measured by the temperature sensor for the said downstream end,
- the controller is configured to increase the rate of filling of a tank connected to a downstream end when the temperature measured by the sensor for measuring the temperature for the said end drops, and to decrease the rate of filling of a tank connected to a downstream end when the temperature measured by the temperature sensor for the said end rises,
- the device comprises a flowmeter for measuring the flow rate of gas in each of the downstream ends, the said flowmeters being connected to the controller, the controller being configured to control the flow rate-control and/or pressure-control member for each end as a function of the flow rate measured by the said flowmeter for the said downstream end,
- the controller is configured to calculate a mean temperature of the quantity of gas transferred in each downstream end on the basis of the measurements from the temperature sensor and from the flowmeter, the controller being configured to control the flow rate-control and/or pressure-control member for each end as a function of this mean temperature of the quantity of gas transferred, notably so as to increase the rate of filling of a tank connected to a downstream end when the mean temperature of the quantity of gas transferred drops and to decrease the rate of filling of a tank connected to a downstream end when this mean temperature of the quantity of gas transferred rises,
- the controller is configured to control the flow rate-control and/or pressure-control member using feedback control,
- the transfer circuit comprises, between the upstream end and the downstream ends, a portion comprising at least two parallel distinct pipes, the said parallel pipes each comprising a respective gas temperature regulating member, the parallel pipes each comprising a first end intended to be connected to the source and a second end connected to each of the downstream ends of the circuit via a set of respective valves, the device comprises a source comprising one or more pressurized-gas stores connected in series and/or in parallel to the upstream end of the circuit, the source comprises at least two sets of fluid at different temperatures, the gas temperature regulating member comprising a mixer configured to mix fluid from the at least two sets in order to achieve a determined temperature, the device comprises a source comprising at least one liquefied-gas store, the gas temperature regulating member comprises a portion of the transfer circuit which is duplicated, having two parallel branches one of which comprises an exchanger for warming the fluid, the temperature regulating device further comprising a set of valves configured to dictate the distribution of the fluid coming from the liquefied-gas store into the two parallel branches so as to regulate the temperature of the mixture of fluid downstream of the temperature regulating member, the gas temperature regulating member comprises a heat exchanger providing an exchange of heat between the gas of the circuit and a cold source such as a cooling fluid, the temperature regulating member is controlled in such a way as to cool the pressurized gas to a determined temperature that is a function of the rate of filling imposed by the gas flow rate-control and/or gas pressure-control member(s), with the source comprising one or more pressurized-gas stores connected in series and/or in parallel to the upstream end of the circuit, the temperature regulating member is controlled in such a way as to cool the pressurized gas to a determined temperature that is a function of the pressure differential between, on the one hand, the high pressure of the gas supplied by a pressurized-gas store during a gas transfer and, on the other hand, the low pressure of the tank that is to be filled, the temperature regulating member is controlled in such a way as to cool the pressurized gas to a determined temperature ensuring, downstream of the flow rate-control and/or pressure-control member(s), a gas temperature comprised between −25° C. and −40° C., notably between −17.5° C. and −40° C.

The invention also relates to a method for filling several pressurized-gas tanks, particularly vehicle hydrogen tanks, via a device comprising a fluid transfer circuit equipped with an upstream end connected to at least one gas source and at least two parallel downstream ends intended to be connected to distinct tanks, the method comprising a step of cooling the gas transferred from the source towards the downstream ends in the one same communal temperature regulating member, the method comprising a step of transferring gas into distinct tanks connected to respective downstream ends, the flow rate and/or the pressure of the gas transferred into the tanks being controlled independently via distinct respective regulating members situated in the downstream ends.

The invention can also relate to any alternative device or method comprising any combination of the features above or below within the scope of the claims.

BRIEF DESCRIPTION OF THE FIGURES

Other specifics and advantages will become apparent from reading the following description given with reference to the figures in which.

DETAILED DESCRIPTION OF THE INVENTION

Figure 1:
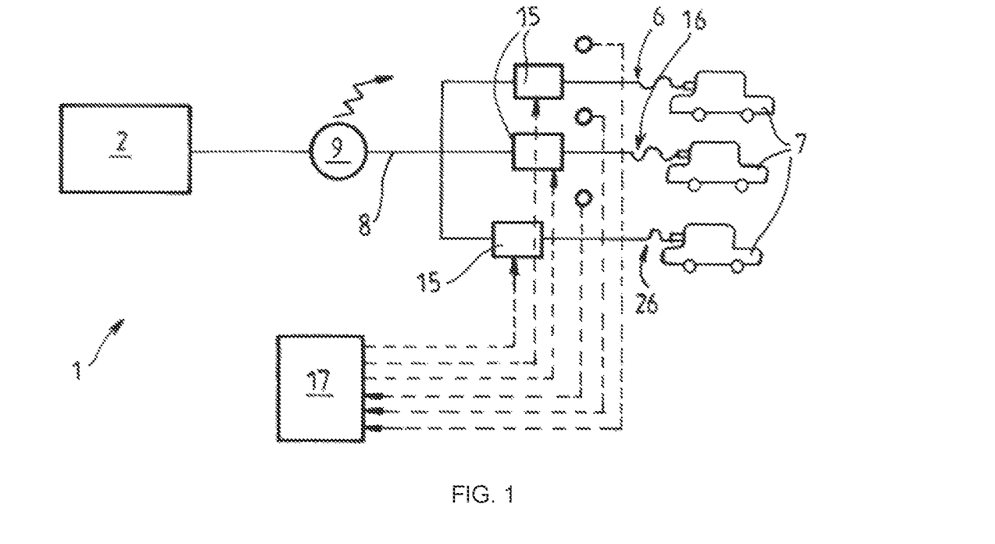
FIG. 1 is a schematic and partial view illustrating one example of the structure and operation of a filling device according to the invention.

The pressurized-gas tank filling device 1 depicted schematically in [FIG. 1] may notably be a filling station for filling vehicle hydrogen tanks 7.

This device conventionally comprises a fluid transfer circuit 8 equipped with an upstream end connected to at least one source 2 of pressurized gas (preferably at least two sources) and at least two parallel downstream ends 6, 16, 26 which are intended to be connected to distinct tanks 7 that are to be filled (distribution hoses fitted with nozzle guns or equivalent for example).

The transfer circuit 8 comprises a temperature regulating member 9 for regulating the temperature of the gas transferred from the source 2 towards the downstream end or ends. This temperature regulating member 9 is designed in particular to bring the gas transferred to a determined temperature as detailed hereinafter. In particular, the regulating member 9 may be configured in such a way as to cool the gas from the source 2 (when the gas from the source is at a higher temperature than the determined temperature) and/or to warm the gas (when the gas from the source is at a temperature lower than the determined temperature).

The gas temperature regulating member 9 is positioned in the transfer circuit 8 upstream of the at least two downstream ends 6, 16, 26. What that means to say is that the gas temperature regulating member 9 is common to several of the downstream ends 6, 16, 26. Thus, the gas transferred in each of the downstream ends to the tanks 7 being filled (simultaneously or not) has been temperature-regulated by the one same communal member 9.

In addition, the downstream ends 6, 16, 26 of the transfer circuit 8 each comprise a respective control member 15 for controlling the flow rate and/or the pressure of the transferred gas and configured to control the flow rate and/or the pressure in each of the downstream ends 6, 16, 26 independently.

That allows the cooling of several distributors to be performed communally while at the same time allowing fillings to be carried out which are optimized for distinct situations by performing an expansion or regulation of the flow rate of the high-pressure gas cooled upstream.

The member 15 for controlling the flow rate and/or the pressure of each downstream end 6, 16, 26 may for example comprise a controlled valve 15 for controlling the pressure or any other suitable member that makes it possible to regulate a flow rate and/or a pressure downstream. The filling device 1 preferably comprises an electronic controller 17 configured to control the said valves 15 or equivalent.

The controller 17 may comprise a computer or a set of microprocessor(s) or any other suitable data storage and data processing electronic device able to control at least the valves 15.

The controller 7 may notably be configured (programmed) to control the said valves 15 according to one or more quick-fill algorithms establishing identical or distinct respective rates of pressure increase in the said tanks being filled.

For preference, a temperature sensor 18 is provided in each downstream end 6, 16, 26 to measure the temperature of the gas, the said sensors 18 being connected to the controller 17. For preference, the temperature sensors 18 are positioned downstream of the respective flow rate-control and/or pressure-control members 15, so as to measure the temperature of the gas after expansion/flow rate regulation, just before it is transferred into a tank 7.

In particular, the controller 17 may advantageously be configured to control the flow rate-control and/or pressure-control member 15 for each downstream end 6, 16, 26 as a function of the temperature measured by the temperature sensor 18 for the said downstream end 6, 16, 26.

For example, the controller 17 may be configured to increase the rate of filling of a tank 7 connected to a downstream end when the temperature measured by the sensor 18 for measuring the temperature for the said end 6, 16, 26 drops, and to decrease the rate of filling of a tank connected to a downstream end when the temperature measured by the temperature sensor 18 for the said end 6, 16, 26 rises.

For preference, the device comprises a flowmeter 19 for measuring the flow rate of gas in each of the downstream ends 6, 16, 26 (cf. [FIG. 2]), the said flowmeters 19 being connected to the controller 17, and the controller 17 is configured to control the flow rate-control and/or pressure-control member 15 for each end as a function of the flow rate measured by the said flowmeter 19 for the said downstream end 6, 16, 26. For example, the controller 17 is configured to calculate a mean temperature of the quantity of gas transferred into each tank 7 connected to a downstream end 6, 16, 26 on the basis of the measurements from the temperature sensor 18 and from the flowmeter (19). The controller 17 may be configured to control the flow rate-control and/or pressure-control member 15 for each end as a function of this mean temperature of the quantity of gas transferred, notably so as to increase the rate of filling of a tank connected to a downstream end when the mean temperature of the quantity of gas transferred drops and to decrease the rate of filling of a tank connected to a downstream end when this mean temperature of the quantity of gas transferred rises. For preference, the controller 17 does not regulate the temperature regulating member 9 (the member 9 is preferably independent).

Figure 2:
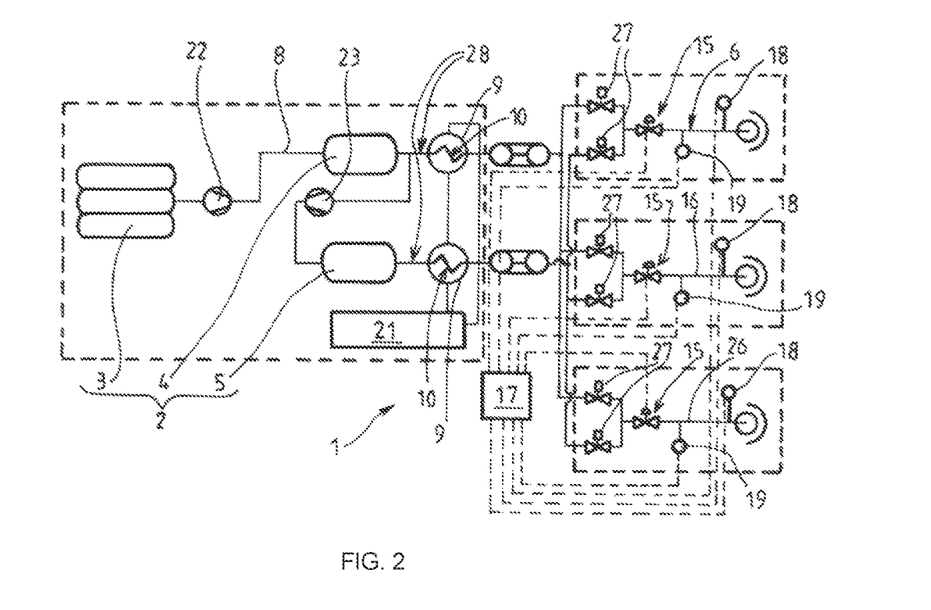
FIG. 2 is a schematic and partial view illustrating another example of the structure and operation of a filling device according to the invention.

The flowmeter 19 is not restricted to a member that directly measures the flow rate of gas in the circuit. As an alternative or in combination, this flow rate may be calculated using known measures from measurements of pressure and temperature in the circuit and/or in the tank that is to be filled, notably downstream of each regulating valve 15.

The controller 17 may in particular be configured to control the flow rate-control and/or pressure-control member 15 using feedback control.

Thus, the device 1 therefore cools the gas upstream in the circuit 8 at the service station, making it possible to make the cooling part communal to the various distributors 6, 16, 26 downstream. By controlling the filling flow rate independently for each of the ends 6, 16, 26 downstream (preferably in real-time and with feedback control as a function of the temperature of the gas at the distributor), the device makes it possible independently to compensate for the fluctuations in temperature through Joule-Thomson effect with pressure variations that are specific to each distributor. This arrangement makes it possible to avoid overheating of the tanks 7 that are to be filled.

Thus, the device 1 provides cooling of the gas at high pressure (namely before it is expanded in each distributor 6, 16, 26). As explained above, this regulated temperature can be chosen and calculated as a function of at least one of the following:

the desired rate of filling
the anticipated Joule-Thomson effect upon expansion (dependent on the pressure levels of the tanks 7 that are to be filled),
the known heat losses along the lines.

The number of pressure (cascade) levels available to the service station has an impact on the level of expansion. The more pressure levels that are available, the less need there will be for expansion downstream. For example, if two pressure levels (for example 450 bar and 900 bar) are available, at a temperature difference of 0-20° C., the regulated temperature will be regulated between −45° C. and −40° C. If, on the other hand, there are three different pressure levels (for example 300 bar, 600 bar, 900 bar) available, the temperature difference may be comprised between 0-14° C. and the temperature may be regulated between −35° C. and −40° C.

For example, for a service station 1 in which hydrogen is stored in two buffer stores at respective pressure levels of 450 bar and 900 bar in a source 2, the Joule-Thomson effect leads to heating of the order of 0 to 20° C. in the case of hydrogen. In order to have, on average, a gas temperature of −33° C. at the downstream outlet from the distributors 6, 16, 26, the hydrogen needs to be cooled upstream to a temperature typically comprised between −45° C. and −40° C. prior to its expansion.

This temperature may differ for the different pressure levels in the station.

Figure 6:
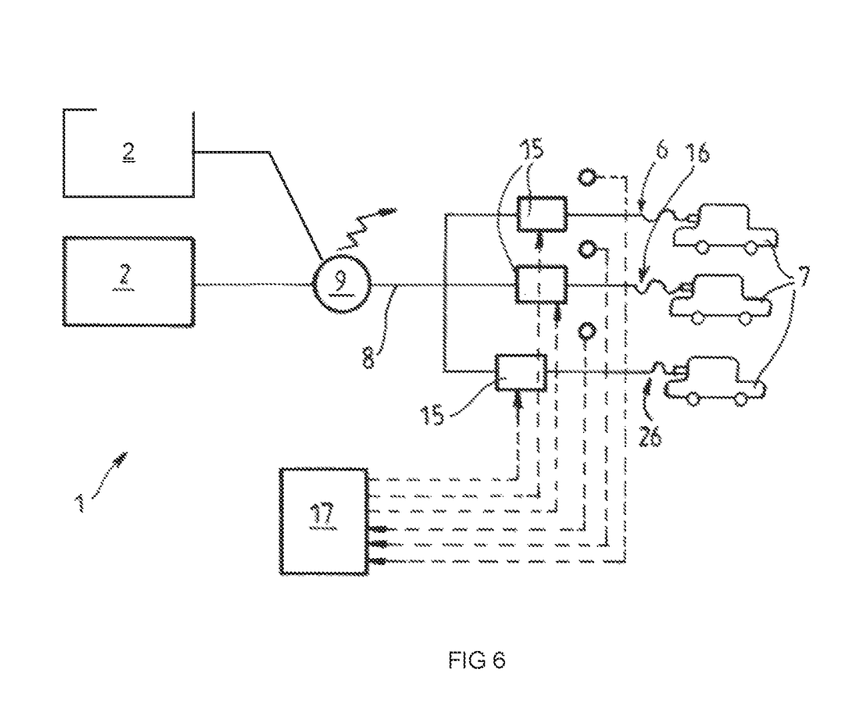
FIG. 6 is a schematic and partial view illustrating another example of the structure and operation of a filling device according to the invention.

As seen in [FIG. 6], the source may comprise at least two sets of fluid at different temperatures. In other words, there are two sources 2 of fluid at different temperatures. Also, the gas temperature regulating member 9 comprises a mixer configured to mix fluid from the at least two sets in order to achieve a determined temperature.

In the example of [FIG. 2], the gas source comprises a gas store 3 (for example several gas containers in parallel containing gas at a pressure, notably at a pressure comprised between 50 and 500 bar). Downstream in the transfer circuit 8 a first compressor 22 allows a first buffer store 4 to be filled (for example at a pressure comprised between 200 and 700 bar). Downstream of the first buffer store 4, a second compressor 23 may be provided to fill a second buffer store 5 at a higher pressure (for example at a pressure comprised between 500 and 900 bar).

The hydrogen coming from the source 2 may thus be compressed by one or more compressors 22, 23 so that it can be stored in buffer stores at different pressures with a view to transferring gas into the tanks 7 by successive (cascaded) pressure equalization operations. Thus, the buffer stores 4, 5 can be connected in parallel (and in series) to each of the downstream ends 6, 16, 26 of the transfer circuit 8. A cooling exchanger 10 is provided to cool the gas leaving each buffer store 4, 5 before it is fed to the downstream ends 6, 16, 26.

As illustrated, the heat exchanger 10 may be an exchanger providing an exchange of heat between the gas of the circuit 8 and a cold source 21 such as a cooling fluid which may or may not circulate in a loop. The gas temperature regulating member 9 may thus comprise or consist of this heat exchanger 10.

As illustrated, the transfer circuit 8 preferably comprises, between the upstream end and the downstream ends 6, 16, 26, a portion comprising at least two distinct parallel pipes 28. The said parallel pipes 28 each comprise a respective gas temperature regulating member 9 (cooling exchanger 10 in this example). These two parallel pipes are connected upstream respectively to the outlet of the two buffer stores 4, 5. These two parallel pipes 28 are connected downstream, via a set of valves 27, to all the downstream ends 6, 16, 26 of the distribution circuit 8.

Thus, the downstream ends 6, 16, 26 are connected in parallel to each of the two parallel pipes 28 of the circuit. In this way, a tank 7 connected to a downstream end 6, 16, 26 can be supplied with gas from one or other (or both) buffer store(s) 4, 5 with, in each instance, communal upstream cooling 9, 10 (in this example there are two buffer stores, but there could be three or more of these).

These valves 27 make it possible to select the cooled hydrogen coming from the source 2 that has the most suitable pressure level for filling the tank 7.

For example, hydrogen may be withdrawn from the so-called medium-pressure line (upper pipe 28 in [FIG. 1]) if the pressure demanded is below this pressure in the corresponding medium-pressure buffer store 4. This hydrogen can then be expanded downstream in the valve 15 down to the required pressure. Because of the Joule-Thomson effect, the expanded hydrogen will have a temperature preferably comprised between −40° C. and −25° C.

As indicated schematically by the discontinuous lines, all the components of the transfer circuit 8 as far as the temperature regulating member(s) 9, 10 may form part of an upstream entity or "upstream station".

Likewise, all the components downstream of the temperature regulating member(s) 9 may form part of a downstream distribution entity (accessible to the users). Between these two entities, the cooled gas transfer line or lines may be thermally insulated and/or cooled.

Figure 3:
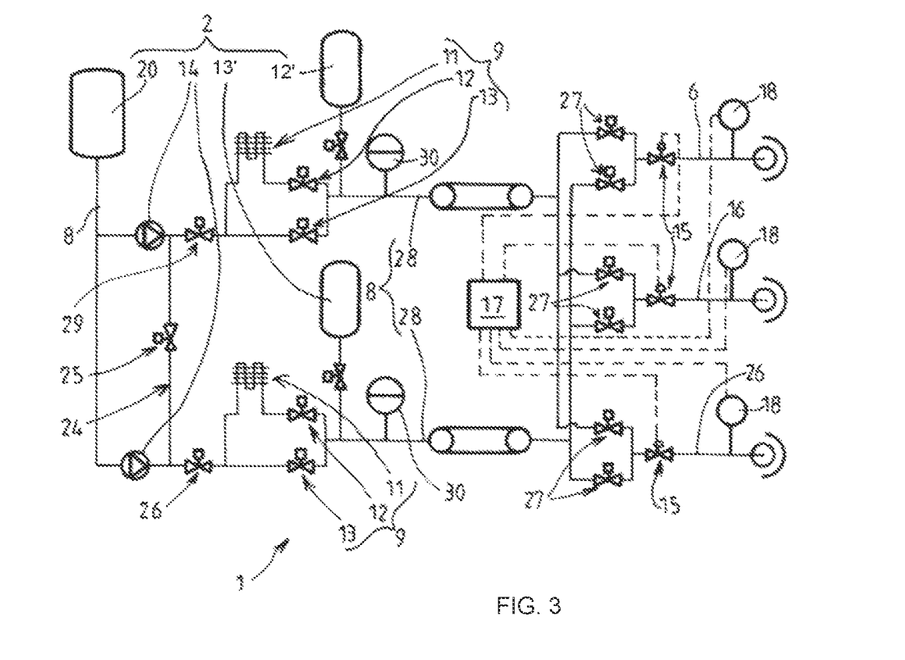
FIG. 3 is a schematic and partial view illustrating another example of the structure and operation of a filling device according to the invention.

In the example of [FIG. 3], the source 2 comprises a liquefied-gas store 20 which, via respective valves or pumps 14, supplies two parallel pipes 28 each one comprising a respective gas temperature regulating member 9. As before, these two parallel pipes 28 are connected downstream, via a set of valves 27, respectively to all the downstream ends 6, 16, 26 of the distribution circuit 8.

In addition, a cross pipe 24 (fitted with an optional valve 29) may be provided for transferring fluid from one pipe 28 to the other upstream of the gas temperature regulating members 9.

Downstream of the pump 14 and upstream of the respective temperature regulating member 9, each pipe 28 may comprise an optional valve 29. What that means to say is that the pipe 24 and the valves 25 and 29 can be omitted.

The gas temperature regulating member 9 may comprise a portion of the transfer circuit 8 which is duplicated, having two parallel branches one of which comprises an exchanger 11 for warming the fluid. The temperature regulating member 9 further comprises a set of valves 12, 13 which is configured to control the distribution of the fluid coming from the liquefied-gas store 20 into the two parallel branches so as to regulate the temperature of the fluid to a determined temperature. What that means to say is that the pressurized fluid is distributed between the warming exchanger 11 and a bypass portion bypassing this exchanger 11 so as to regulate its temperature downstream. This gas at a desired temperature may supply a respective buffer store 12', 13' and/or the downstream pipe leading towards the downstream distribution ends 6, 16, 26.

Thus, liquid hydrogen can be withdrawn (pumped) from the liquid store 2 then stored in the buffer stores 12', 13' at different pressures (at ambient temperature or kept cold at a controlled temperature).

Hydrogen at a determined temperature may thus be obtained in a way known per se by mixing cold hydrogen coming directly from the pump 14 with warmer hydrogen coming from the buffer stores 12', 13'.

More generally, temperature regulation may be achieved by performing suitable mixing between relatively warm hydrogen and relatively cold hydrogen. The relatively warm hydrogen may for example come from pressurized-gas buffer store(s) and/or from a cold source via a warming operation (using a heat exchanger for example). The colder hydrogen may for example come from a cryogenic liquid source and/or from a source of fluid that is warmer but cooled by a cooling system (cooled by means of a cold fluid such as liquid nitrogen for example). Any other type of suitable temperature regulation may be envisaged.

As illustrated, a temperature sensor 30 may be positioned in each pipe 28 downstream of the buffer store 12', 13' and of the temperature regulating member 9.

In the examples above, two buffer stores are anticipated. Of course, as an alternative, one or more than two buffer stores may be anticipated (notably three). These buffer stores may be filled with gas at different pressure levels. During a filling of (a) tank(s) 7, hydrogen is withdrawn preferably from the buffer store or stores that are at the nearest higher pressure level to the tank 7 that is to be filled. When the pressures between this first buffer store and the tank 7 that is to be filled are equalized (when the pressure and/or flow rate differential is below a threshold value), the device 1 then uses another buffer store (change of pressure bank) and so on.

This makes it possible to minimize the heating through Joule-Thomson effect. The high-pressure gas is cooled at the upstream station then conveyed to the distributor (downstream ends 6, 16, 26) where it is expanded in the distributor (valve(s) 15) before being delivered to the receiving tank(s).

It should be noted that this cascading gas transfer may be supplemented and/or substituted and/or replaced by at least one other pressure source, such as a compressor for example.

The architecture therefore allows a combination of cascaded filling, communal upstream cooling prior to expansion/regulation, while at the same time allowing control of the filling in each downstream end. For preference, the pressure in each downstream end 6, 16, 26 is controlled via a quick-fill algorithm. For example, the controller controls the expansion valves 15 according to the so-called "MC" fill method as described notably in document US2011259469A. The calculation of the rate of fill can therefore be based on this mean temperature according to theoretical or empirical equations, notably those described by the MC method or the fill protocol of standard SAE J2601.

As before, control over the rate of fill in the tank 7 is preferably achieved via a pressure ramp at the corresponding valve 15 (valve of the PCV "Pressure Control Valve" type for example). This control over the rate of fill downstream may be achieved dynamically as a function of the measurement 18 of the actual temperature of the gas at the downstream distributor. At any moment, the temperature at the distributor 6, 16, 26 can be measured. A mean temperature weighted by the delivered mass can be calculated. This makes it possible to estimate the amount of energy introduced into the filled tank 7 and the extent to which this tank 7 is heated. The rate of fill (pressure ramp) can be controlled using feedback control as a function of this mean temperature at the distributor. Filling is accelerated when this mean temperature is low, and vice versa.

As an alternative or in combination, control over the rate of fill downstream may be achieved dynamically as a function of the temperature of the tank and/or of the temperature of the gas in the tank. This temperature may be communicated by the tank 7 to the controller and/or may be estimated by the controller as a function of other parameters as described for example in the results published by the European "HyTransfer" Project (cf. notably the document entitled "Pre-Normative Research for Thermodynamic Optimization of Fast Hydrogen Transfer" from the Hytransfer project (https://www.fch.europa.eu/project/pre-normative-research-thermodynamic-optimization-fast-hydrogen-transfer)).

The device and method described hereinabove make it possible to simplify the structure or operation of large-capacity service stations by minimizing the number of connections between the upstream part of the station and the downstream distributors.

The device 1 also makes it possible to limit the number, cost and complexity of the cooling components, particularly for service stations that have a liquefied-gas source where a mixture of cold and hot is difficult to achieve.

The architecture makes it possible to improve the modular nature of the station. Specifically, it is possible easily to add one or more distributors without changing the overall upstream architecture of the circuit.

The bulkiness of the distributors downstream is also reduced.

Compared with conventional filling, the filling proposed can be more irregular but achieve the same filling time without exact control over the temperature of the expanded fluid downstream.

Characteristic curves, as a function of time, of the parameters measured at the downstream end: P, the pressure (reflecting the pressure in the tank 7); Q, the gas flow rate; and T, the temperature, can be found in [FIG. 4] and [FIG. 5], for one example of filling a tank, according to the prior art, and according to the invention, respectively.

Figure 4:
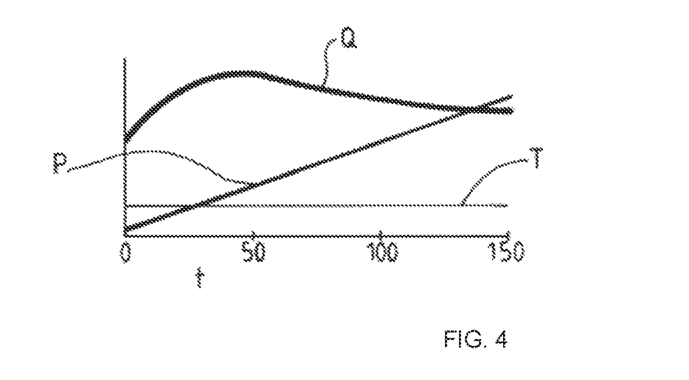
FIG. 4 depicts the characteristic curves of one example of filling according to the prior art.

As visible in [FIG. 4], the rise in pressure P is linear, the temperature T of the gas in the distributor is substantially constant whereas the flow rate Q increases before decreasing.

Figure 5:
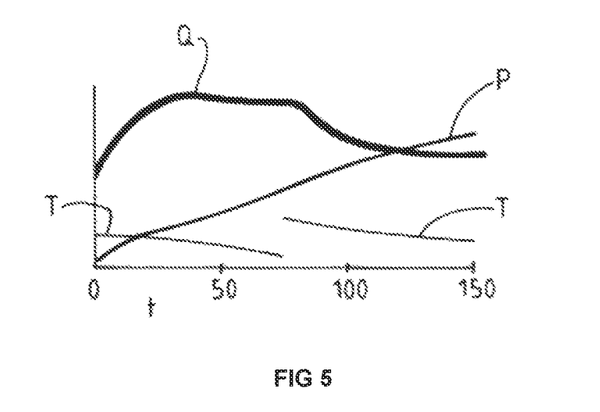
FIG. 5 depicts the characteristic curves of one example of filling according to the invention.

In the example according to the invention in [FIG. 5], the rise in pressure P is less linear, the variation in flow rate Q more irregular, and the temperature T of the gas in the downstream end experiences a discontinuity at the moment of the change in buffer store during cascading.

Thus, according to the invention, the temperature of the filling gas can be relatively lower before the change in pressure bank (for example around 200-400 bar). This leads to a high rate of filling at these pressures where the flow rate of filling is the greatest. This high filling flow rate compensates for the phases after the change in pressure bank where the rate drops because of the high temperature at the distributor.

Thus, advantageously the station can integrate a source of liquid gas (hydrogen). It can be interesting to produce cold by a mixture of cryogenic gas with hotter gas (ambient temperature for example) through a temperature control device.

In a first possibility of integration, the same valve(s) perform(s) both temperature control and pressure ramp control (e.g. quantity of gas per unit of time) of the gas transferred to the tank to be filled.

In this case, it may be necessary to provide a set of valves and interconnecting piping for each end to be connected to a tank.

According on a possible particularity (in combination or independently of the above aspects), at least two buffer tanks intended for separate lines may be used for the same filling line. If two (or more) buffer tanks are at the same pressure (e.g. one buffer tank has a pressure of up to 180 bar and another is at this pressure), these buffer tanks may be used in parallel. Their respective valves open simultaneously and the tanks remain interconnected.

This prevents too big pressure difference and limits the number of valve openings and closures in the life of the components. This makes longer the service life of the components. Electronic control is also simplified. The performance of the station is improved.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A device for filling pressurized-gas tanks, comprising an electronic controller and a fluid transfer circuit that comprises an upstream end intended to be connected to a source of gas and at least two parallel downstream ends adapted and configured to be connected to distinct tanks that are to be filled, wherein:

the transfer circuit further comprises a temperature regulating member for regulating a temperature of the gas that is transferred from the source towards the downstream ends;

the gas temperature regulating member is positioned in the transfer circuit upstream of the at least two downstream ends such that the gas temperature regulating member is common to the at least two downstream ends;

each of the at least two downstream ends of the circuit comprises a respective pressure-control and/or flow rate-control valve that is adapted to independently control a pressure or flow rate of the transferred gas in a respective one of the downstream ends;

the electronic controller is adapted and configured to control each of said pressure-control and/or flow rate-control valve according to one or more quick-fill algorithms establishing identical or distinct respective rates of pressure increase in the said tanks;

in each downstream end, a temperature sensor connected to the controller that is adapted and configured to measure a temperature of the transferred gas; and at least two flowmeters each one of which is adapted and configured for measuring a flow rate of gas in a respective one of the downstream ends, each of the flowmeters being connected to the controller and the controller being further adapted and configured to control the pressure-control and/or flow rate-control valve as a function of the flow rate measured by the said flowmeter for the respective one of the downstream ends, wherein each temperature sensor is positioned downstream of the respective pressure-control and/or flow rate-control valve and the controller is further adapted and configured to:

calculate a mean temperature of a quantity of gas transferred in each downstream end on a basis of the measurements from a respective one of the temperature sensors and from a respective one of the flowmeters; and control the pressure-control and/or flow rate-control valve for each end as a function of the calculated mean temperature so as to increase a rate of filling of a tank connected to a respective one of the downstream ends when the calculated mean temperature drops and to decrease the rate of filling of the tank connected to the respective one of the downstream ends when the calculated mean temperature rises.

2. The device of claim 1, wherein the controller is further adapted and configured to control the pressure-control and/or flow rate-control valve for each downstream end as a function of the temperature measured by the respective temperature sensor for the respective downstream end.

3. The device of claim 2, wherein the controller is further adapted and configured to:

increase a rate of filling of a tank connected to first one of the downstream ends when the temperature measured by the sensor for measuring the temperature for the first one of said ends drops, and to decrease a rate of filling of the tank connected to the first one of the downstream end when the temperature measured by the temperature sensor for the first one of said ends rises; and increase a rate of filling of a tank connected to second one of the downstream ends when the temperature measured by the sensor for measuring the temperature for the second one of said ends drops, and to decrease a rate of filling of the tank connected to the second one of the downstream end when the temperature measured by the temperature sensor for the second one of said ends rises.

4. The device of claim 3, wherein the controller is further adapted and configured to control the pressure-control and/or flow rate-control valve using feedback control.

5. The device of claim 1, wherein the transfer circuit further comprises, between the upstream end and the downstream ends, a portion comprising at least two parallel distinct pipes, the said parallel pipes each comprising a respective gas temperature regulating member, each of the parallel pipes comprising a first end adapted and configured to be connected to the source and a second end that is connected to each of the downstream ends of the circuit via a respective set of valves.

6. The device of claim 1, further comprising a source comprising one or more pressurized-gas stores connected in series and/or in parallel to the upstream end of the circuit.

7. The device of claim 6, wherein one or more pressurized-gas stores are connected in parallel to the upstream end of the circuit and at least two of the storage tanks are intended to supply respectively distinct ones of the downstream ends by default but can be mutualized for a same downstream end.

8. The device of claim 1, wherein the source comprises at least two sets of fluid at different temperatures and the gas temperature regulating member comprises a mixer adapted and configured to mix fluids at different temperatures from the at least two sets in order to achieve a determined temperature.

9. The device of claim 1, further comprising a source comprising at least one liquefied-gas store, wherein:

the transfer circuit further comprises two parallel branches, the two parallel branches being the gas temperature regulating member;

one of the two parallel branches comprises an exchanger adapted and configured to warming a fluid from the at least one liquefied-gas store;

the temperature regulating device further comprises a set of valves adapted and configured to dictate a distribution of the fluid coming from the liquefied-gas store into the two parallel branches so as to regulate a temperature of a mixture of fluid downstream of the temperature regulating member.

10. The device of claim 9, wherein the set of valves is further adapted and configured to perform regulation of both temperature and a rate of pressure rise in said tanks so as to provide pressure ramp regulation of the gas being transferred.

11. The device of claim 1, wherein the gas temperature regulating member comprises a heat exchanger performing an exchange of heat between the gas being transferred by the circuit and a cold source.

12. The device of claim 1, wherein the device for filling is for filling vehicle hydrogen tanks.

13. A method for filling several pressurized-gas tanks using the device of claim 1, comprising the steps of:

transferring gas, with the fluid transfer circuit, into distinct tanks connected to respective downstream ends;

independently controlling a flow rate and/or a pressure of the gas transferred into the tanks via the pressure-control and/or flow rate-control valves; and using the electronic controller to control each of said pressure-control and/or flow rate-control valve according to the one or more quick-fill algorithms establishing identical or distinct respective rates of pressure increase in the said tanks.

14. The method of claim 13, wherein the pressurized-gas tanks are vehicle hydrogen tanks.

* * * * *